(12) United States Patent  
Chen et al.

(10) Patent No.: US 8,783,424 B2  
(45) Date of Patent: Jul. 22, 2014

(54) BRAKING DEVICE

(75) Inventors: Shang-Te Chen, Taichung (TW);  
Kuan-Wen Chen, Taichung (TW);  
Kung-Ying Li, Chiayi (TW); Hsi-Hung Hsiao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 64 days.

(21) Appl. No.: 13/483,929

(22) Filed: May 30, 2012

(65) Prior Publication Data

US 2013/0092484 A1 Apr. 18, 2013

(30) Foreign Application Priority Data

Oct. 17, 2011 (TW) .............................. 100137574 A (51) Int. Cl.  
*F16D 55/08* (2006.01)

(52) U.S. Cl.  
USPC ........................... 188/72.7; 188/343; 188/170

(58) Field of Classification Search  
USPC ............. 188/170, 72.3, 72.4, 72.6, 72.7, 335, 188/343, 44, 107  
See application file for complete search history.

(56) References Cited

U.S. PATENT DOCUMENTS

| | | | |
|---|---|---|---|
| 3,388,606 A * | 6/1968 | Hill | 74/110 |
| 3,741,349 A * | 6/1973 | Banks | 188/42 |
| 3,786,721 A | 1/1974 | Reda | |
| 3,986,584 A * | 10/1976 | Wright et al. | 188/71.8 |
| 4,018,313 A * | 4/1977 | Hart et al. | 188/343 |
| 4,280,603 A * | 7/1981 | Kanwar | 188/343 |
| 6,227,336 B1 * | 5/2001 | Rudy | 188/43 |
| 6,457,383 B1 | 10/2002 | Kschier | |
| 6,460,678 B1 * | 10/2002 | Henk et al. | 192/143 |
| 6,578,677 B2 * | 6/2003 | Hsu et al. | 188/43 |
| 6,802,402 B2 * | 10/2004 | Bausch et al. | 188/171 |
| 7,029,214 B2 | 4/2006 | Shiba et al. | |

(Continued)

FOREIGN PATENT DOCUMENTS

| | | |
|---|---|---|
| CA | 1159638 A1 | 1/1984 |
| CN | 2835553 | 11/2006 |

(Continued)

OTHER PUBLICATIONS

Zimmer GmbH Technische Werkstätten, "Clamping and braking element for linear guides", http://www.zimmer-gmbh.com, pp. 1-37, 2004.

(Continued)

*Primary Examiner* — Thomas Irvin  
(74) *Attorney, Agent, or Firm* — Rabin & Berdo, P.C.

(57) ABSTRACT

A braking device includes a base, a braking component, and a driving component including a reset member. The braking component has a clamping block. The driving component includes a movable member, a chamber therein and a first butting portion. The movable member passes through the driving member. One end of the movable member has a piston accommodated in the chamber, and the other end of the movable member has a second butting portion. The reset member is disposed in the chamber. The piston butts the reset member under an external force, and the first butting portion and the second butting portion are kept away from each other, and when the external force vanishes, the reset member butts the piston, and the first butting portion and the second butting portion are kept close to each other so as to achieve a braking effect.

12 Claims, 11 Drawing Sheets

(56) References Cited

U.S. PATENT DOCUMENTS

| | | |
|---|---|---|
| 7,124,861 B2 * | 10/2006 | Maher .................... 188/72.7 |
| 7,296,506 B2 | 11/2007 | Lindblom |
| 2005/0173206 A1 * | 8/2005 | Reuter et al. ............. 188/72.7 |
| 2008/0289915 A1 | 11/2008 | Lu et al. |
| 2010/0147123 A1 | 6/2010 | Baumann |
| 2010/0175505 A1 | 7/2010 | Tatsuda |
| 2010/0252377 A1 | 10/2010 | Lazar et al. |

FOREIGN PATENT DOCUMENTS

| | | |
|---|---|---|
| CN | 201136106 | 10/2008 |
| CN | 101801598 A | 8/2010 |
| CN | 101862972 A | 10/2010 |
| CN | 101934477 A | 1/2011 |
| TW | M274187 U | 9/2005 |
| TW | M313682 U | 6/2007 |
| TW | M328921 U | 3/2008 |
| TW | 20090653 A | 2/2009 |
| TW | 200906535 A | 2/2009 |
| TW | 200916257 A | 4/2009 |
| TW | M359398 U | 6/2009 |
| TW | M373253 | 2/2010 |
| TW | 377277 | 4/2010 |
| TW | M394203 U | 12/2010 |
| TW | 201124228 A | 7/2011 |

OTHER PUBLICATIONS

Zimmer GmbH Technische Werkstätten, "Clamping Elements for Linear Guideways", http://www.zimmer-gmbh.com, pp. 1-120, 2004.

Transatlantic Connection, Inc., "PM controller and jet pump with examples of application", http://www.transconn.com/, pp. 1-6, 2007.

Zollern GmbH & Co. KG, "Hydrostatic Bearing System", http://www.zollern.de, pp. 1-8, 2012.

Taiwan Patent Office, Office Action, Patent Application Serial No. TW100137574, Feb. 14, 2014, Taiwan.

* cited by examiner

BRAKING DEVICE

CROSS-REFERENCE TO RELATED APPLICATIONS

This non-provisional application claims priority under 35 U.S.C. §119(a) on Patent Application No(s). 100137574 filed in Taiwan, R.O.C. on Oct. 17, 2011, the entire contents of which are hereby incorporated by reference.

BACKGROUND

1. Technical Field

The present disclosure relates to a braking device, and in particular, to a braking device capable of reacting to power cut.

2. Related Art

Recently, with the rapid change of technology and widespread information, various automatic machine tools of high precision come out successively. All the types of casing appearances and even plastic injection molds can be machined by the automatic machine tool, so as to obtain a product size with high precision. Generally, a machining platform of the automatic machine tool is able to shift linearly or rotate relative to a base of the automatic machine tool, so as to meet various machining requirements. Therefore, high-precision linear rail modules and high-precision bearing modules have become essential to the automatic machine tools.

Taking a machine tool using a hydrostatic bearing module as an example, because the hydrostatic bearing module is loaded with a quite heavy working platform, when the hydrostatic bearing module is shut down due to power cut while being in operation, the hydrostatic bearing module will continuously rotates due to the inertia of the working platform. As such, damage of precise transmission elements or failure of workpieces in the machine tool may occur, and operators may be hurt or even dead due to the damage of the machine tool. In addition, the precision of the hydrostatic bearing module may be affected by the power cut, leading to a decreased precision of the hydrostatic bearing module.

SUMMARY

The present disclosure provides a braking device, which comprises a base, a braking component, and a driving component. The base has a sliding groove therein. The braking component has a first clamping block, and the first clamping block is disposed on the base in a manner that the first clamping block can move along a first axis. The driving component comprises a driving member, a movable member, and a reset member. The driving member is disposed in the sliding groove, and has a chamber therein, and a first butting portion at one end. The movable member is disposed in the sliding groove, and penetrates the driving member in a manner that the movable member can shift relative to the driving member. One end of the movable member has a piston accommodated in the chamber, and the other end of the movable member has a second butting portion. The reset member is disposed in the chamber, and two opposite ends of the reset member butt the piston and an inner wall of the chamber respectively. When the piston butts the reset member under an external force, the first butting portion of the driving member and the second butting portion of the movable member are kept away from each other along a second axis intersecting the first axis, so that the first clamping block is at a first starting position, and when the external force vanishes, the reset member performs reset and butts the piston, the first butting portion of the driving member and the second butting portion of the movable member are kept close to each other along the second axis, and the first butting portion or the second butting portion butts the first clamping block, so that the first clamping block shifts from the first starting position to a first braking position along the first axis towards a direction away from the second axis.

According to the braking device disclosed in the present disclosure, the external force generated by a hydraulic pressure is reduced in case of power cut, so that the reset member butts the piston, and the first butting portion and the second butting portion move close to each other, and thus the clamping block shifts to the braking position, so as to achieve a power-off braking effect. Therefore, the decrease of the precision of the machine tool caused by continuous operation of the working platform of the machine tool in case of power off is prevented.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In view of the issue in the related art, a safety device needs to be installed on the machine tool, so that the safety device of the machine tool can help to stop the rotating working platform in case of power cut, so as to prolong the service life of the hydrostatic bearing and improve the safety of the operator in work.

Accordingly, the present disclosure is a braking device, which can stop a machine tool while power cut occurs, so as to prolong the service life of a hydrostatic bearing in the machine tool and improve the safety of the operator in work.

Figure 1A:
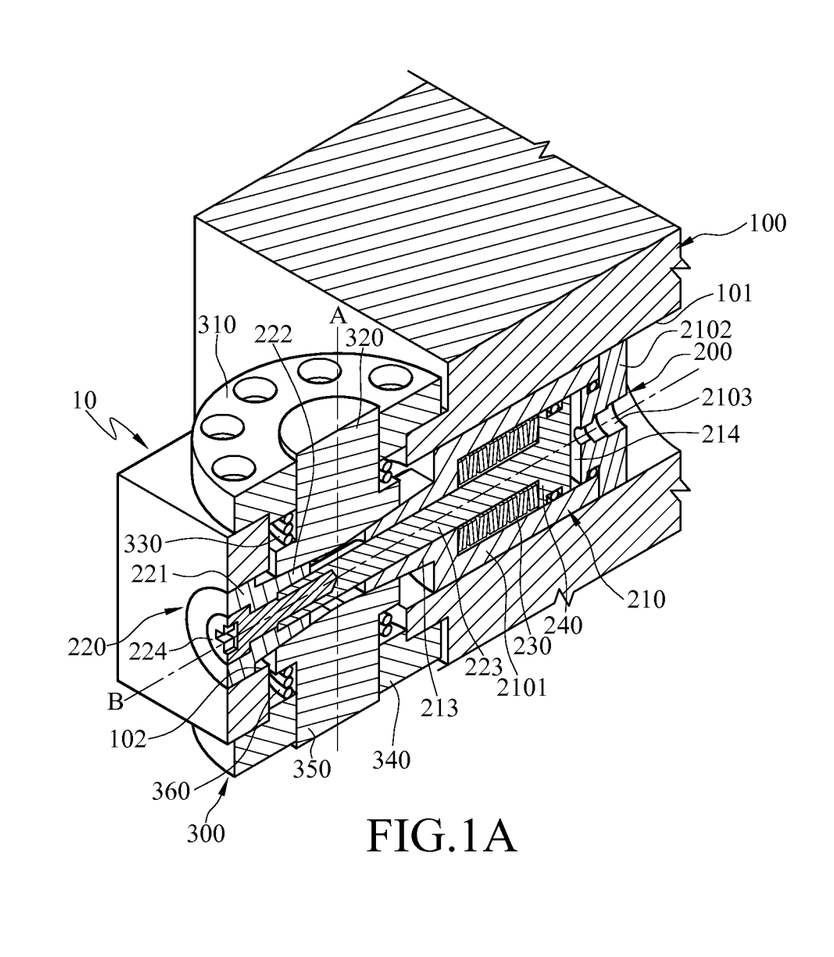
FIG. 1A is a structural sectional view of a braking device according to an embodiment of the present disclosure.
Figure 1B:
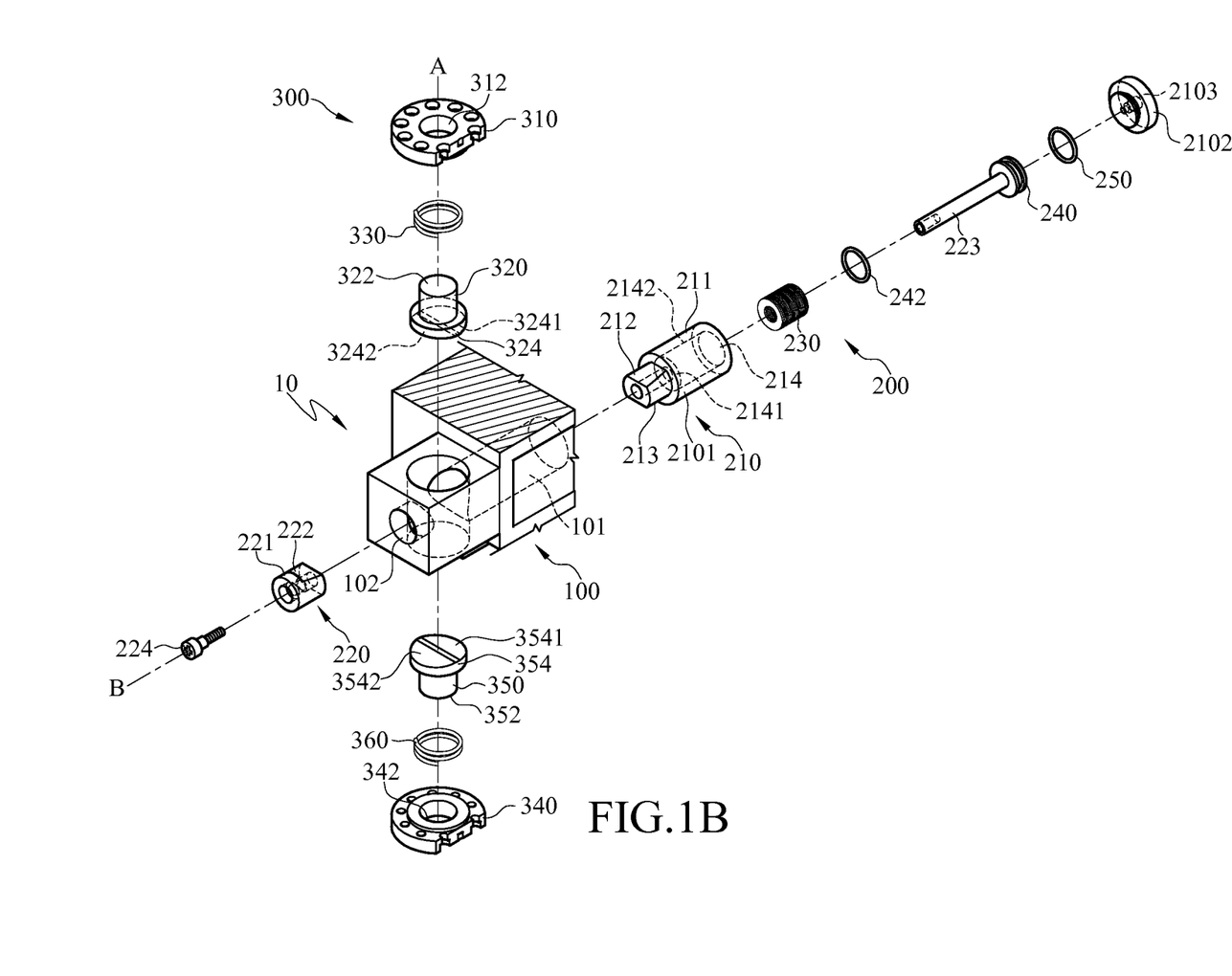
FIG. 1B is an exploded structural sectional view of a braking device according to an embodiment of the present disclosure.

FIG. 1A is a structural sectional view of a braking device according to an embodiment of the present disclosure, and FIG. 1B is an exploded structural sectional view of a braking device according to an embodiment of the present disclosure.

Referring to FIGS. 1A and 1B, in this embodiment, the braking device 10 comprises a base 100, a braking component 300, and a driving component 200. The base 100 has a first sliding groove 101 and a second sliding groove 102 communicating with each other, and the first sliding groove 101 and the second sliding groove 102 extend along a second axis B. The braking component 300 comprises a first clamping block 320 disposed on the base 100 in a manner that the first clamping block 320 can move along a first axis A, wherein the first axis A is roughly perpendicular to the second axis B.

In addition, in this embodiment and some embodiments, the braking component 300 further comprises a first fastener 310 and a first elastic member 330. The first fastener 310 is fastened to the base 100 by screwing or welding, but the present disclosure is not limited thereto. The first fastener 310 has a first through groove 312 extending along the first axis A, and communicating with the first sliding groove 101 and the second sliding groove 102. The first clamping block 320 movably passes through the first through groove 312 of the first fastener 310, so that the first clamping block 320 can shift along the first axis A. The first clamping block 320 has a first braking end 322, and a first guiding end 324 opposite to each other, and the first guiding end 324 is adjacent to the second axis B, that is, a distance from the first guiding end 324 to the second axis B is shorter than that from the first braking end 322 to the second axis B. Moreover, the first guiding end 324 further has two first guiding surfaces 3241 and 3242, and the first guiding surface 3241 and the first guiding surface 3242 are connected and form an obtuse angle, so that the first guiding end 324 forms a conical body. In addition, the first guiding surface 3241 and the first guiding surface 3242 form an acute angle with the second axis B respectively, and the slope of the first guiding surface 3241 and the first guiding surface 3242 is roughly ⅕, but the present disclosure is not limited thereto.

The first elastic member 330 according to this embodiment may be a compression spring, but the present disclosure is not limited thereto. The first elastic member 330 surrounds the first clamping block 320, and is located between the first fastener 310 and a flange on the first guiding end 324. The first elastic member 330 normally butts the first clamping block 320, so that the first guiding end 324 of the first clamping block 320 is normally kept away from the first fastener 310 and close to the second axis B, so as to be kept at a first starting position.

Furthermore, in this embodiment and some embodiments, the braking component 300 further comprises a second clamping block 350, a second fastener 340, and a second elastic member 360. The second fastener 340 is fastened to the base 100, and the second fastener 340 and the first fastener 310 are located respectively at two opposite sides of the second axis B. The second fastener 340 has a second through groove 342, and the second through groove 342 extends along the first axis A and communicates with the first sliding groove 101 and the second sliding groove 102. The second clamping block 350 movably passes through the first through groove 312 of the first fastener 310, so that the second clamping block 350 can shift to and fro along the first axis A relative to the first fastener 310. The second clamping block 350 has a second braking end 352 and a second guiding end 354 opposite to each other, and the second guiding end 354 is adjacent to the second axis B. Moreover, the second guiding end 354 further has two second guiding surfaces 3541 and 3542, and the second guiding surface 3541 and the second guiding surface 3542 form an obtuse angle. Each of the second guiding surface 3541 and the second guiding surface 3542 forms an acute angle with the second axis B, and the slopes of the second guiding surface 3541 and the second guiding surface 3542 are roughly ⅕, but the present disclosure is not limited thereto.

The second elastic member 360 surrounds the second clamping block 350, and is located between the second fastener 340 and a flange on the second guiding end 354. The second elastic member 360 normally butts the second clamping block 350, so that the second clamping block 350 is normally kept away from the second fastener 340 and close to the second axis B, so as to be kept at a second starting position. Further, the second clamping block 350 and the first clamping block 320 are symmetrically disposed on the base 100.

In addition, the driving component 200 according to this embodiment comprises a driving member 210, a movable member 220, and a reset member 230. The driving member 210 is disposed in and movable with respect to the first sliding groove 101, and has a chamber 214 therein. Moreover, in this embodiment and some embodiments, the driving member 210 further comprises a main body 2101 and a cover plate 2102, and the main body 2101 has a first end 211 and a second end 212 opposite to each other. The second end 212 of the main body 2101 has a first butting portion 213, and the first butting portion 213 contacts both the first guiding surface 3241 of the first clamping block 320 and the second guiding surface 3541 of the second clamping block 350. The chamber 214 is located in the main body 2101, and has an opening at the first end 211 of the main body 2101. The cover plate 2102 is disposed at the first end 211 of the main body 2101, covers the opening of the chamber 214, and has a liquid inlet hole 2103 communicating with the chamber 214. The liquid inlet hole 2103 allows liquid such as oil or water to be injected into the chamber 214, so as to increase the hydraulic pressure in the chamber 214.

In addition, the movable member 220 according to this embodiment is movably disposed in the second sliding groove 102, and passes through the driving member 210 in a manner that the movable member 220 can shift relative to the driving member 210. Moreover, in this embodiment and some embodiments, the movable member 220 further comprises a piston 240, a sliding block 221, and a connecting rod 223 extending along the second axis B. The piston 240 is disposed in the chamber 214 in a manner that the piston is capable of shifting to and fro. One end of the connecting rod 223 passes through the first butting portion 213 and is connected to the piston 240, and the other end of the connecting rod 223 is connected to the sliding block 221. Furthermore, the sliding block 221 according to this embodiment is fixed to the connecting rod 223 by a screw 224, but the present disclosure is not limited thereto. The sliding block 221 has a second butting portion 222 contacting both the first guiding surface 3242 of the first clamping block 320 and the second guiding surface 3542 of the second clamping block 350. Moreover, the second butting portion 222 of the sliding block 221 faces the first butting portion 213 of the driving member 210, and the first butting portion 213 and the second butting portion 222 may be kept close or away from each other through the relative motion between the movable member 220 and the driving member 210.

In addition, the reset member 230 according to this embodiment is disposed in the chamber 214, and the two opposite ends of the reset member 230 butt respectively the piston 240 and an inner wall 2141 of the chamber 214. The reset member 230 may be a set of reeds, but the present disclosure is not limited thereto. For example, the reset member 230 may also be a compression spring. Moreover, the piston 240 according to this embodiment is located between the liquid inlet hole 2103 and the reset member 230.

In addition, in this embodiment and some embodiments, the chamber 214 has an annular inner wall surface 2142, and the driving component 200 further comprises a seal ring 250. The seal ring 250 surrounds one side of the cover plate 2102, and is located between the cover plate 2102 and the annular inner wall surface 2142. The seal ring 250 is used for sealing a clearance between the cover plate 2102 and the opening of the chamber 214, so as to prevent the leakage of the liquid in the chamber 214 from the clearance between the cover plate 2102 and the opening of the chamber 214.

Moreover, in this embodiment and some embodiments, the driving component 200 further comprises a seal ring 242 surrounding the outer surface of the piston 240, and located between the piston 240 and the annular inner wall surface 2142. The seal ring 242 is used for sealing the clearance between the piston 240 and the annular inner wall surface 2142, so as to prevent the liquid in the chamber 214 from flowing from one side of the piston 240 close to the liquid inlet hole 2103 via such clearance to a position in the chamber 214 where the reset member 230 is accommodated.

Figure 2:
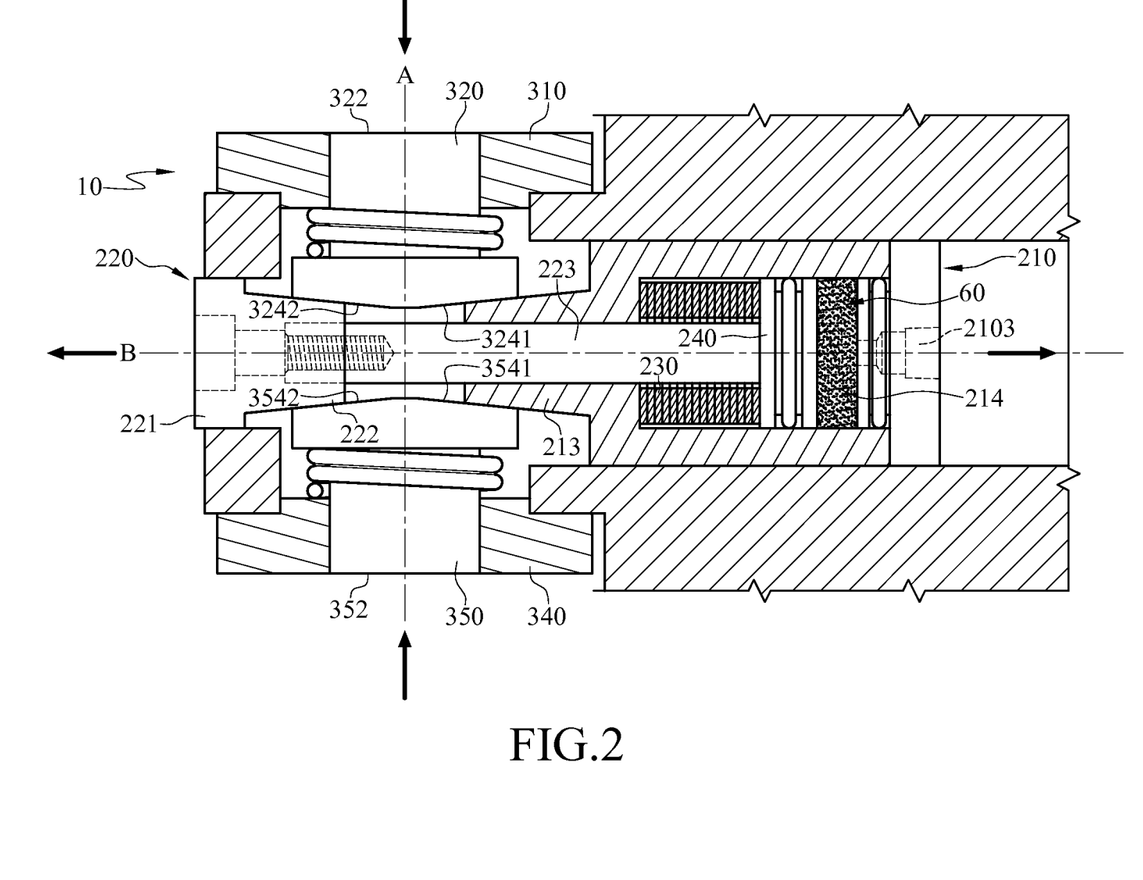
FIG. 2 is a schematic structural view of a clamping block at a starting position according to an embodiment of the present disclosure.
Figure 3:
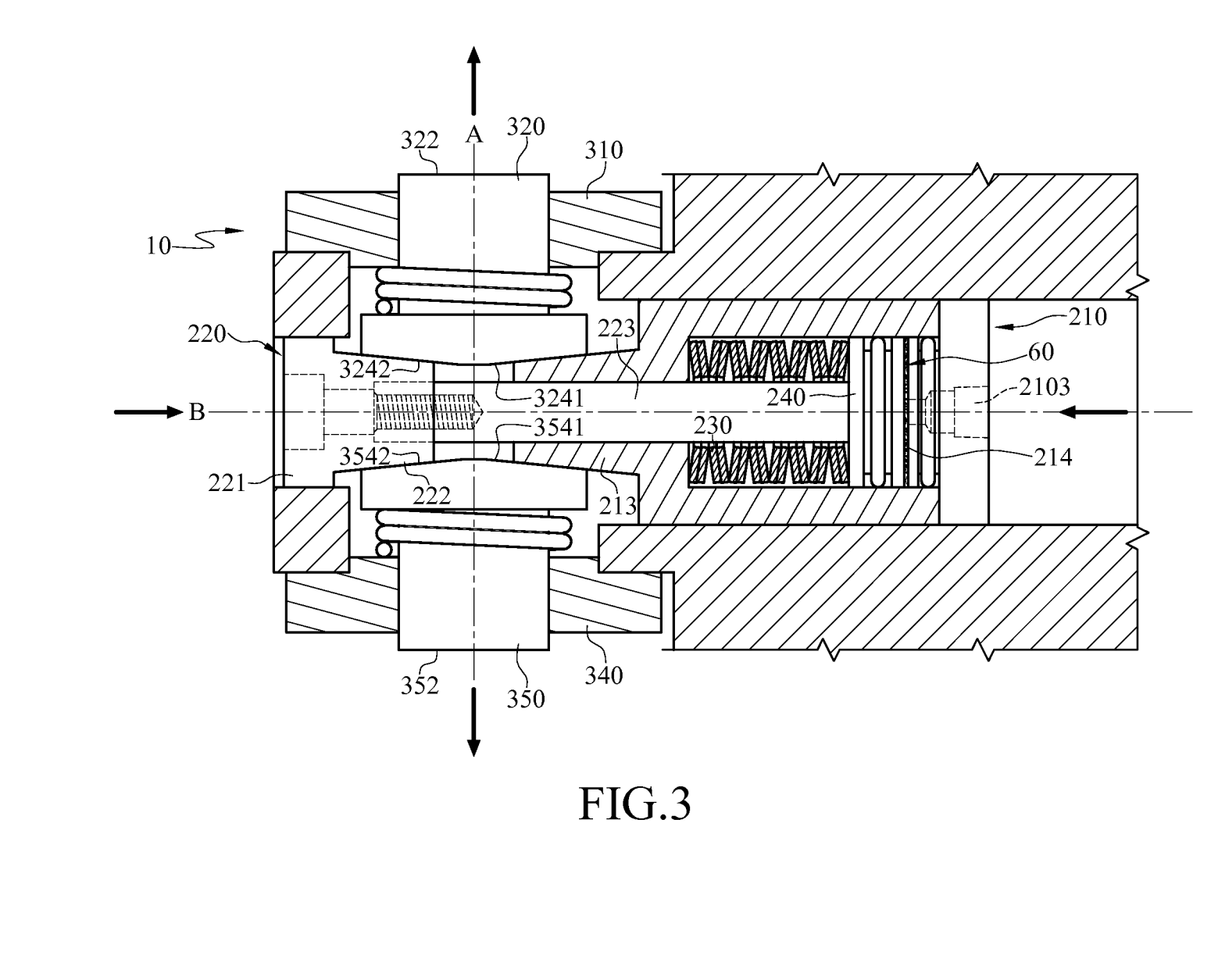
FIG. 3 is a schematic structural view of a clamping block at a braking position according to an embodiment of the present disclosure.

Referring to FIGS. 2 and 3, an operation principle of the braking device 10 of this embodiment is described in the following.

The braking device 10 may be disposed on a machine tool, and connected to an oil press (not shown) via the liquid inlet hole 2103. When power is supplied to the oil press, the oil press can continuously inject oil 60 into the chamber 214 by using a pump (not shown), so that the hydraulic pressure in the chamber 214 is raised to generate a pushing force to butt the piston 240. The piston 240 presses the reset member 230 so the piston 240 shifts in a direction away from the liquid inlet hole 2103 and, therefore, the connecting rod 223 drives the sliding block 221 at the other end to move in the same direction, and the driving member 210 shifts in a reverse direction under a reacting force of the reset member 230. Further, when the piston 240 presses against the reset member 230 under a force, the first butting portion 213 of the driving member 210 and the second butting portion 222 of the movable member 220 move along the second axis B in the first sliding groove 101 and the second sliding groove 102 in the base 100, and thus move away from each other, as shown in FIG. 2. In this case, the first clamping block 320 and the second clamping block 350 are kept close to each other by being kept at the first starting position and the second starting position, as shown in FIG. 2. And, the first braking end 322 of the first clamping block 320 and the second braking end 352 of the second clamping block 350 are located respectively in the first fastener 310 and the second fastener 340.

When the machine tool stops operating while power cut occurs, the oil press does not operate under power cut either. In this case, the oil 60 in the chamber 214 is leaked from the liquid inlet hole 2103, so that the hydraulic pressure in the chamber 214 drops. In this manner, the external force applied to the piston 240 by the hydraulic pressure vanishes, so that the reset member 230 performs reset and butts the piston 240 to shift towards the liquid inlet hole 2103, and, therefore, the first butting portion 213 of the driving member 210 and the second butting portion 222 of the movable member 220 are kept close to each other along the second axis B, as shown in FIG. 3. In this case, the first butting portion 213 butts both the first guiding surface 3241 of the first clamping block 320 and the second guiding surface 3541 of the second clamping block 350, and the second butting portion 222 butts the first guiding surface 3242 of the first clamping block 320 and the second guiding surface 3542 of the second clamping block 350. At this time, the first clamping block 320 is butted by the first butting portion 213 and the second butting portion 222, and thus shifts from the first starting position to the first braking position along the first axis A in a direction away from the second axis B and the connecting rod 223, as shown in FIG. 3. Likely, the second clamping block 350 is also butted and shifts from the second starting position to the second braking position along the first axis A in the direction away from the second axis B or the connecting rod 223, as shown in FIG. 3. In other words, the first clamping block 320 and the second clamping block 350 are butted respectively to the first braking position and the second braking position, and thus are kept away from each other, as shown in FIG. 3. At this time, the first braking end 322 of the first clamping block 320 and the second braking end 352 of the second clamping block 350 protrude respectively from an outer surface of the first fastener 310 and the second fastener 340, so that the first braking end 322 or the second braking end 352 can press a rotating or moving working platform, so as to force the working platform to stop running, thereby achieving the power-off braking effect.

It should be noted that, in this embodiment, the external force for driving the driving member 210 and the movable member 220 to shift relative to each other is provided by oil pressure; however, the present disclosure is not limited thereto. For example, in other embodiments, an aerostatic press may be used to replace the oil press, so that a gas pressure is generated by the aerostatic press to provide the external force to drive the driving member 210 and the movable member 220 to shift relative to each other.

Figure 4:
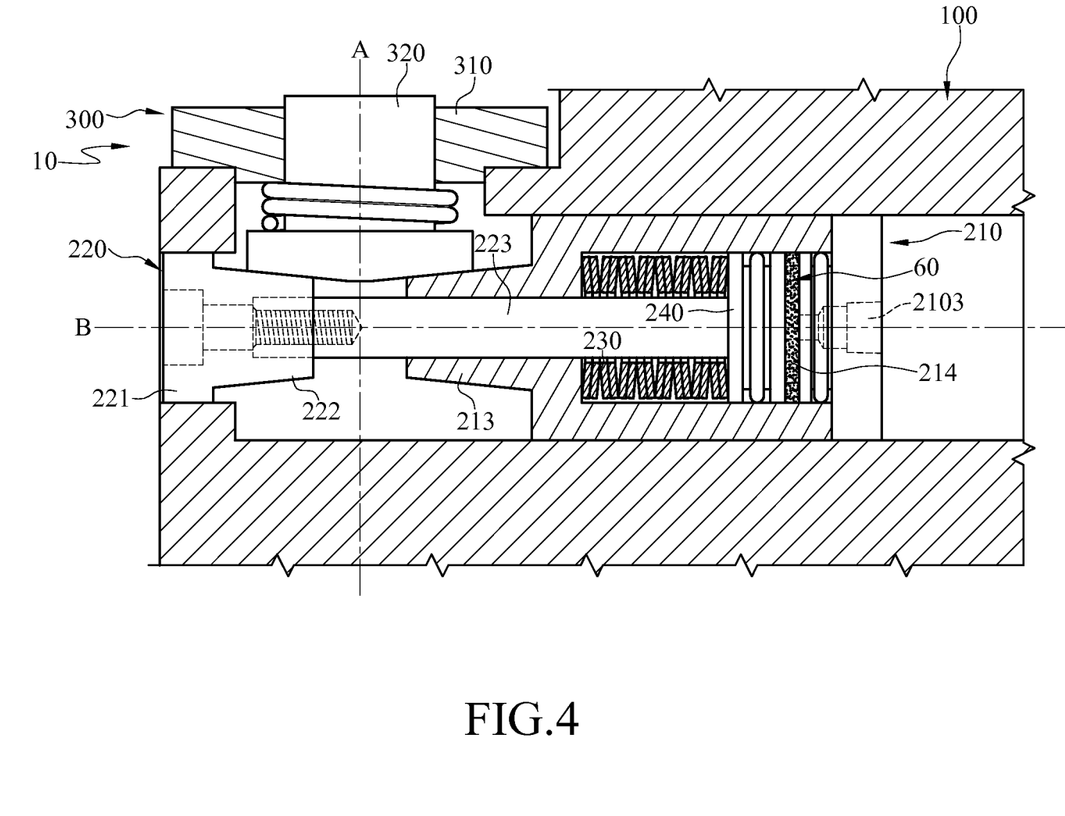
FIG. 4 is a structural sectional view of a braking device according to another embodiment of the present disclosure.

FIG. 4 is a structural sectional view of a braking device according to another embodiment of the present disclosure. Referring to FIG. 4, as this embodiment is similar to that shown in FIG. 1, and the same features are not further described herein again. The difference between this embodiment and that shown in FIG. 1 is that the braking device 10 according to this embodiment does not have the second clamping block 350, the second fastener 340, and the second elastic member 360, that is, the braking device 10 can achieve the power-off braking effect with only the first clamping block 320 in absence of the second clamping block 350.

Figure 5:
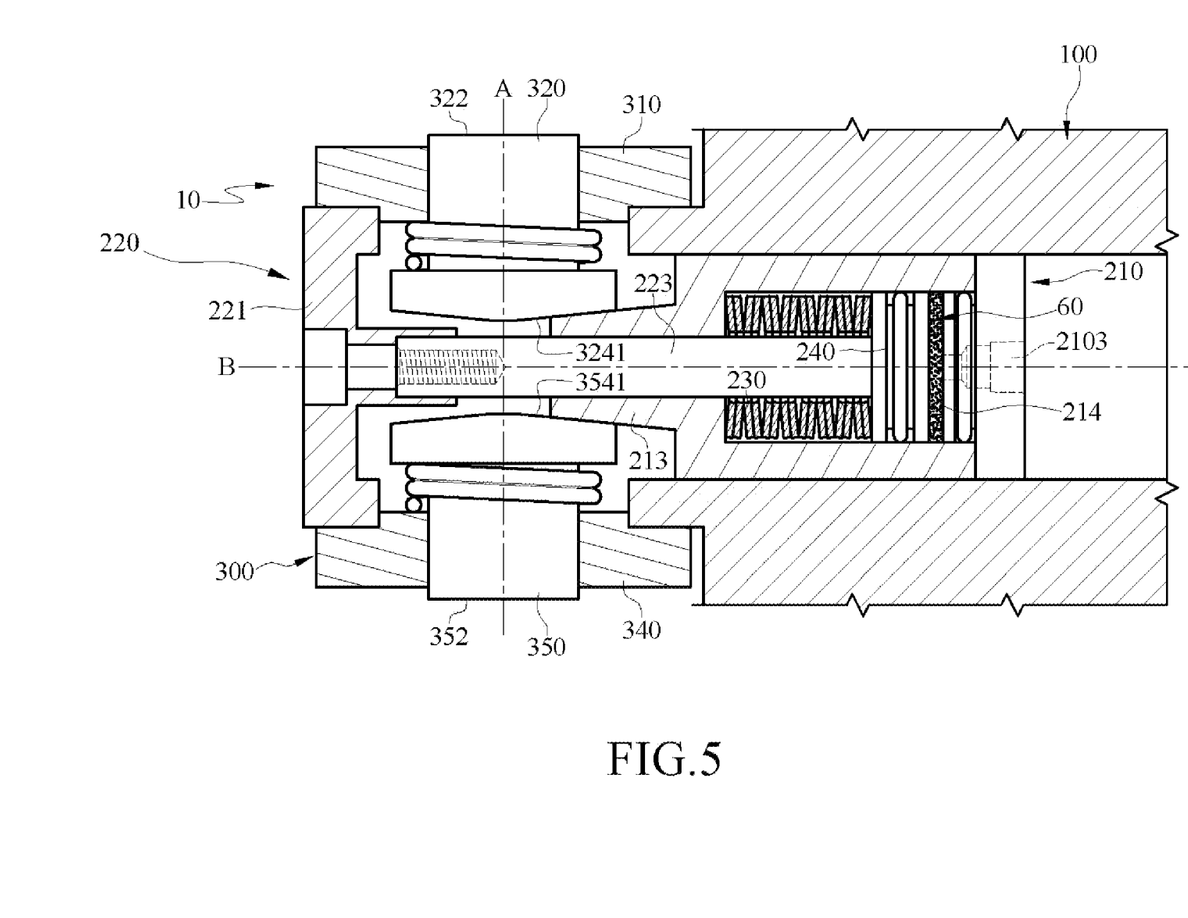
FIG. 5 is a structural sectional view of a braking device according to another embodiment of the present disclosure.

FIG. 5 is a structural sectional view of a braking device according to another embodiment of the present disclosure. Referring to FIG. 5, as this embodiment is similar to that shown in FIG. 1, and the same features are not further described herein again. The difference between this embodiment and that shown in FIG. 1 is that the sliding block 221 according to this embodiment is fastened to the second sliding groove 102 by screwing or welding, but the present disclosure is not limited thereto.

When the reset member 230 performs reset and butts the piston 240, the first butting portion 213 of the driving member 210 moves close to the second butting portion 222 of the movable member 220 along the second axis B. In this case, the first butting portion 213 butts the first guiding surface 3241 of the first clamping block 320 and the second guiding surface 3541 of the second clamping block 350, so that the first clamping block 320 and the second clamping block 350 are forced to be butted respectively to the first braking position and the second braking position, and thus kept away from each other. Such a structural design can also achieve the power-off braking effect.

Figure 6:
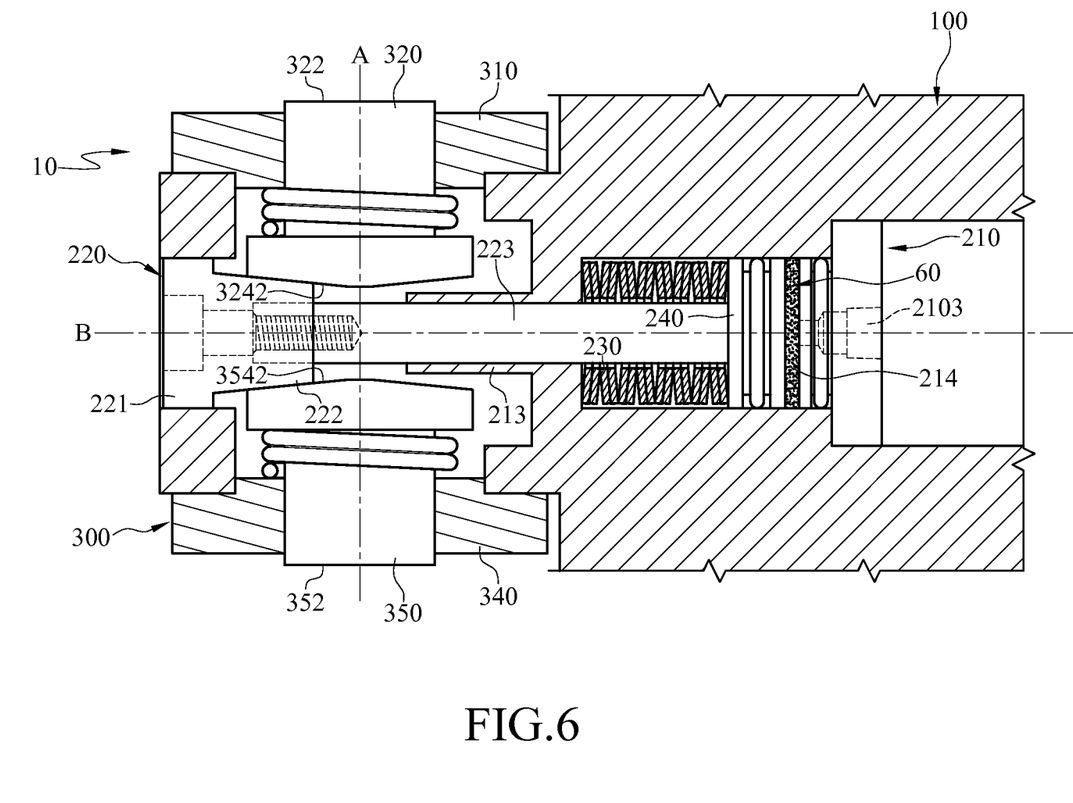
FIG. 6 is a structural sectional view of a braking device according to another embodiment of the present disclosure.

FIG. 6 is a structural sectional view of a braking device according to another embodiment of the present disclosure. Referring to FIG. 6, as this embodiment is similar to that shown in FIG. 1, and the same features are not further described herein again. The difference between this embodiment and that shown in FIG. 1 is that the driving member 210 according to this embodiment is fastened to the first sliding groove 101 by screwing or welding, but the present disclosure is not limited thereto. When the reset member 230 performs reset and butts the piston 240, the second butting portion 222 of the sliding block 221 moves close to the first butting portion 213 of the driving member 210 along the second axis B. In this case, the second butting portion 222 butts the first guiding surface 3242 of the first clamping block 320 and the second guiding surface 3542 of the second clamping block 350, so that the first clamping block 320 and the second clamping block 350 are forced to be butted respectively to the first braking position and the second braking position, and thus kept away from each other. Such a structural design can also achieve the power-off braking effect.

Figure 7:
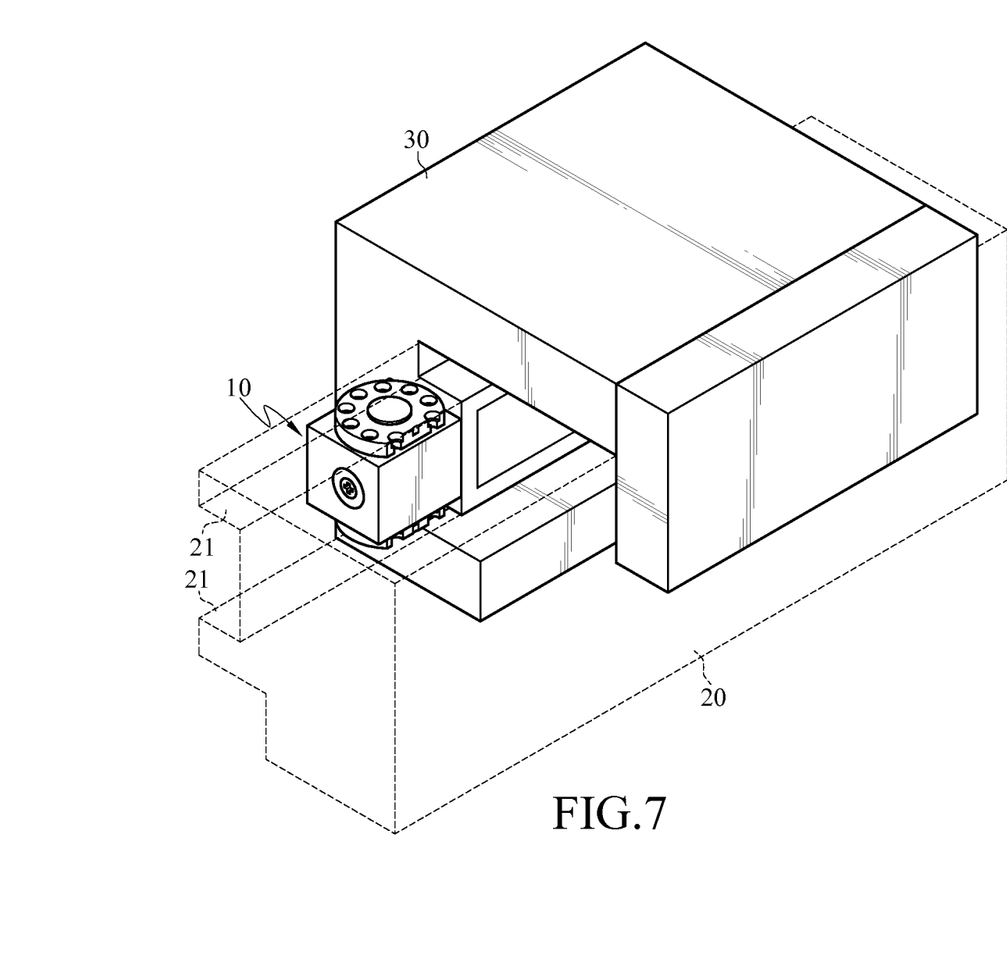
FIGS. 7 and 8 are schematic views showing practical operation of a braking device according to an embodiment of the present disclosure.
Figure 8:
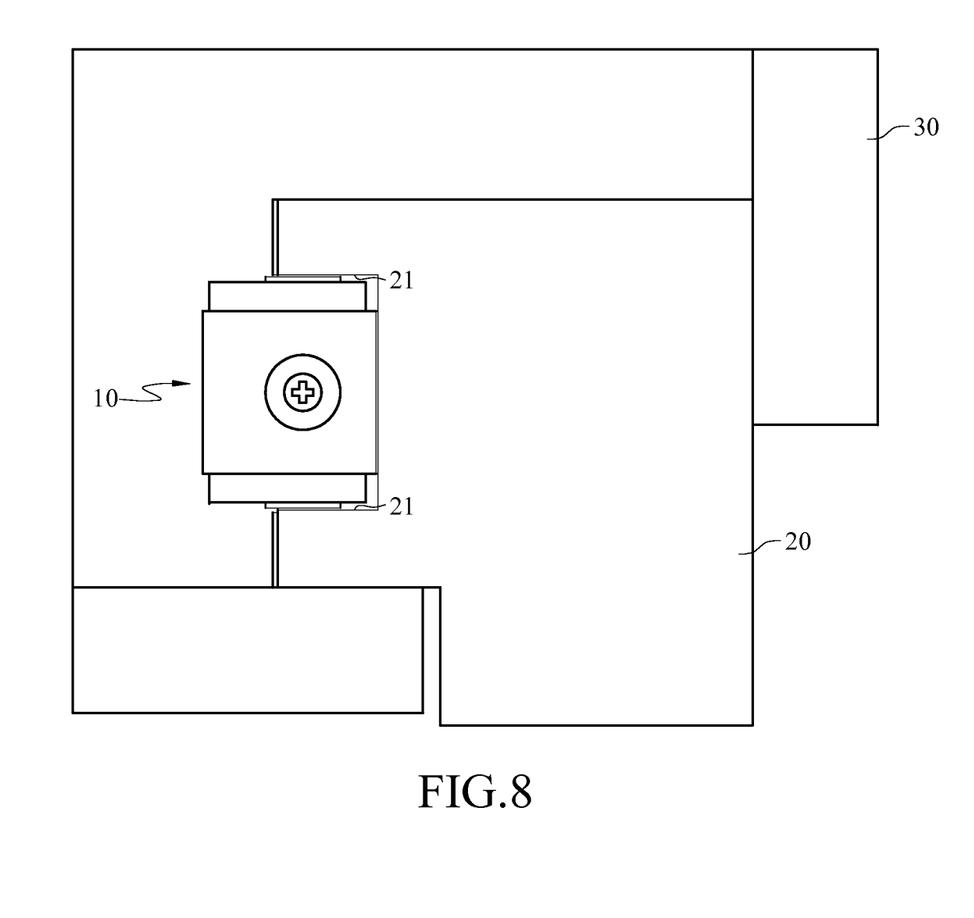

FIGS. 7 and 8 are schematic views showing practical operation of a braking device according to an embodiment of the present disclosure. Referring to FIGS. 7 and 8, the braking device 10 according to this embodiment is disposed on a sliding block 30 connected to a working platform of a machine tool, and the sliding block 30 is disposed on a linear sliding track 20. When the machine tool experiences sudden power cut, the clamping block of the braking device 10 of the sliding block 30 presses a braking surface 21 on the linear sliding track 20, thereby achieving a power-off braking effect.

Figure 9:
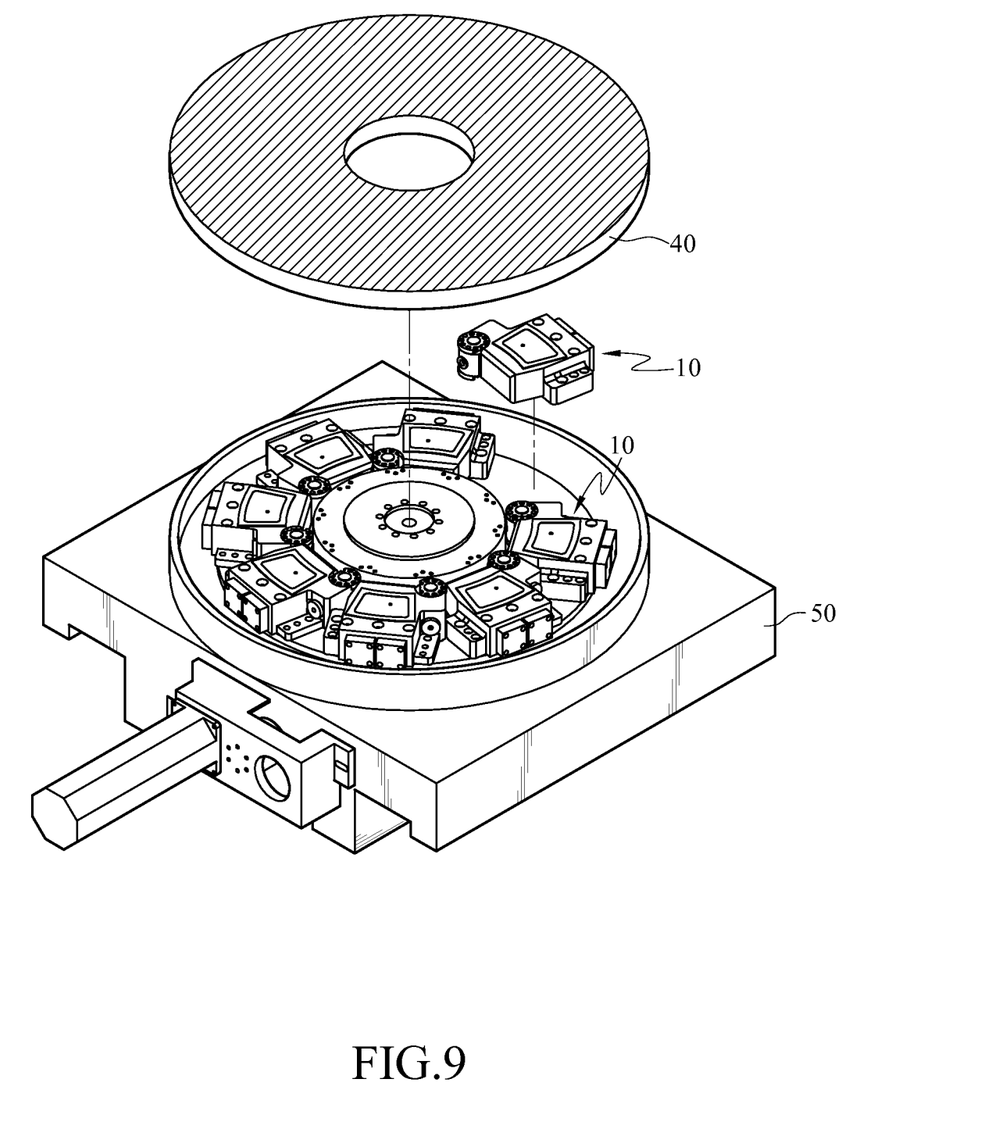
FIGS. 9 and 10 are another schematic views showing practical operation of a braking device according to an embodiment of the present disclosure.
Figure 10:
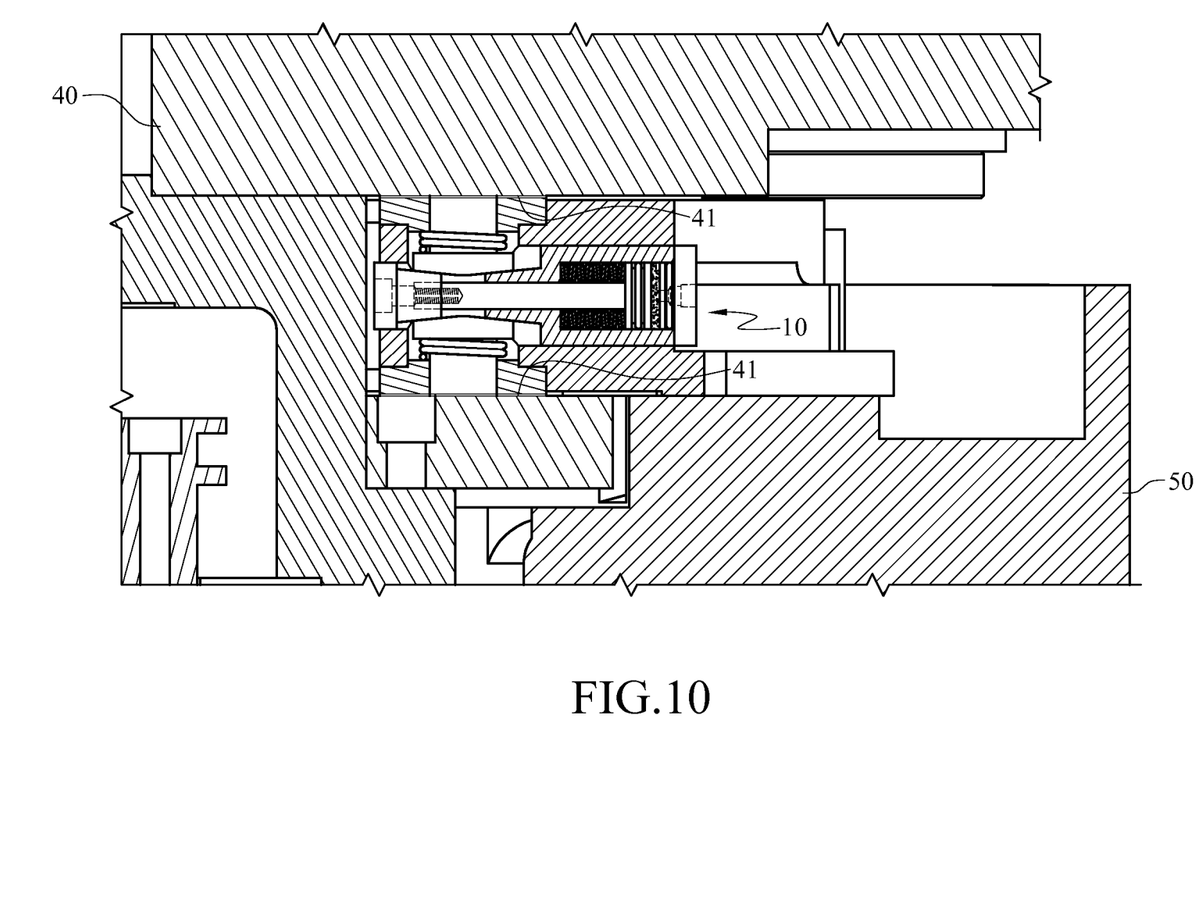

FIGS. 9 and 10 are another schematic views showing practical operation of a braking device according to an embodiment of the present disclosure. Referring to FIGS. 9 and 10, the braking device 10 according to this embodiment is applicable to both a machine tool of linear motion, and a machine tool of rotary motion. For example, the braking device 10 is disposed on a seat 50 connected to the machine tool, and a working platform 40 capable of rotating relative to the seat 50 is disposed on the seat 50. When the machine tool experiences sudden power cut, the clamping block of the braking device 10 on the seat 50 presses a braking surface 41 on the working platform 40, so as to achieve the power-off braking effect. With 2.5 tons of a working platform 40 rotating at 120 rpm as an example, when the braking device 10 according to this embodiment achieves a power-off braking effect, the working platform 40 stops rotating in about 15 seconds. If the machine tool is not disposed with the braking device 10 according to this embodiment, the working platform 40 needs to rotate for about 10 min before stopping, causing the precision of the machine tool to decrease by about 1%. Therefore, the braking device 10 according to this embodiment can really provide a power-off braking effect to the machine tool, so as to prevent the precision decrease of the machine tool.

The braking device according to the embodiments allows the reset member to butt the piston by the external force generated by the hydraulic pressure released in case of power off, so that the first butting portion and the second butting portion are kept close to each other, and the clamping block shifts to the braking position, thereby achieving the power-off braking effect. Therefore, the continuous operation of the working platform of the machine tool in case of power off can be prevented, so as to protect the machine tool and prevent the precision decrease of the machine tool.

What is claimed is:

1. A braking device, comprising:
   a base, having a sliding groove therein;
   a braking component, comprising a first clamping block, disposed on the base in a manner that the first clamping block is capable of moving along a first axis; and
   a driving component, comprising:
      a driving member, disposed in the sliding groove, and having a chamber therein, and a first butting portion at one end;
      a movable member, disposed in the sliding groove, and passing the driving member in a manner that the movable member is capable of shifting relative to the driving member, one end of the movable member having a piston accommodated in the chamber, and the other end of the movable member has a second butting portion; and
      a reset member, disposed in the chamber, two opposite ends of the reset member butting the piston and an inner wall of the chamber respectively;
   wherein when the piston butts the reset member under an external force, the first butting portion of the driving member and the second butting portion of the movable member are kept away from each other along a second axis intersecting the first axis, so that the first clamping block is at a first starting position, and when the external force vanishes, the reset member performs reset and butts the piston, the first butting portion of the driving member and the second butting portion of the movable member are kept close to each other along the second axis, and the first butting portion or the second butting portion butts the first clamping block, so that the first clamping block shifts from the first starting position to a first braking position along the first axis towards a direction away from the second axis.

2. The braking device according to claim 1, wherein the movable member comprises a connecting rod extending along the second axis and a sliding block, one end of the connecting rod passes through the first butting portion to reach the chamber, and is connected to the piston, and the other end of the connecting rod is connected to the sliding block having the second butting portion.

3. The braking device according to claim 1, wherein the driving member comprises a main body and a cover plate, the main body has a first end and a second end opposite to each other, the chamber is located in the main body, the cover plate is located at the first end, the first butting portion is located at the second end of the main body, the cover plate has a liquid inlet hole communicating with the chamber, the piston is located between the liquid inlet hole and the reset member, and the liquid inlet hole is configured to allow a liquid or gas to be injected into the chamber, so as to apply the external force to the piston.

4. The braking device according to claim 3, wherein the chamber has an annular inner wall surface, and the driving component further comprises a seal ring, surrounding the cover plate and located between the cover plate and the annular inner wall surface.

5. The braking device according to claim 1, wherein the driving member and the movable member are both movably disposed in the sliding groove, when the external force vanishes, the reset member performs reset and butts the piston, the first butting portion of the driving member and the second butting portion of the movable member are kept close to each other along the second axis, and the first butting portion and the second butting portion jointly butt the first clamping block, so that the first clamping block shifts from the first starting position to the first braking position along the first axis in the direction away from the second axis.

6. The braking device according to claim 1, wherein the braking component further comprises a first fastener and a first elastic member, the first fastener is fastened to the base, the first clamping block movably penetrates the first fastener, the first clamping block has a first braking end and a first guiding end opposite to each other, the first guiding end is adjacent to the second axis, the first elastic member surrounds the first clamping block, and is located between the first fastener and the first guiding end, and the first clamping block is kept at the first starting position by the first elastic member.

7. The braking device according to claim 1, wherein the braking component further comprises a second clamping block, disposed on the base in a manner that the second clamping block is capable of moving along the second axis, and the second axis is located between the first clamping block and the second clamping block, when the external force vanishes, the reset member performs reset and butts the piston, the first butting portion of the driving member and the second butting portion of the movable member are kept close to each other along the second axis, and the first butting portion or the second butting portion butts the second clamping block, so that the second clamping block shifts from a second starting position to a second braking position along the second axis towards the direction away from the second axis.

8. The braking device according to claim 7, wherein the braking component further comprises a second fastener and a second elastic member, the second fastener is fastened to the base, the second clamping block movably penetrates the second fastener, the second clamping block has a second braking end and a second guiding end opposite to each other, the second guiding end is adjacent to the second axis, the second elastic member surrounds the second clamping block, and is located between the second fastener and the second guiding end, and the second clamping block is kept at the second starting position by the second elastic member.

9. The braking device according to claim 1, wherein the chamber has an annular inner wall surface, and the driving component further comprises a seal ring, surrounding the piston and located between the piston and the annular inner wall surface.

10. The braking device according to claim 1, wherein the external force is originated from a hydraulic pressure or a gas pressure.

11. The braking device according to claim 1, wherein the driving member is movably disposed in the sliding groove, and the movable member is fastened to the base, when the external force vanishes, the reset member performs reset and butts the piston, the first butting portion of the driving member moves close to the second butting portion of the movable member along the second axis, and the first butting portion butts the first clamping block, so that the first clamping block shifts from the first starting position to the first braking position along the first axis towards the direction away from the second axis.

12. The braking device according to claim 1, wherein the movable member is movably disposed in the sliding groove, and the driving member is fastened to the base, when the external force vanishes, the reset member performs reset and butts the piston, the second butting portion of the movable member moves close to the first butting portion of the driving member along the second axis, and the second butting portion butts the first clamping block, so that the first clamping block shifts from the first starting position to the first braking position along the first axis towards the direction away from the second axis.

* * * * *